United States Patent
Fleury et al.

(10) Patent No.: US 8,189,870 B2
(45) Date of Patent: May 29, 2012

(54) PROCESS FOR THE AUTOMATIC CALCULATION OF THE COEFFICIENT OF A SLOPE ABOUT TO BE ASCENDED BY A MOTOR VEHICLE AND AN ASSOCIATED DEVICE

(75) Inventors: Benoist Fleury, Vincennes (FR); Julien Moizard, Paris (FR); Adrien Charpentier, Stuttgart (DE)

(73) Assignee: Valeo Vision, Bobigny (FR)

( * ) Notice: Subject to any disclaimer, the term of this patent is extended or adjusted under 35 U.S.C. 154(b) by 864 days.

(21) Appl. No.: 12/252,508

(22) Filed: Oct. 16, 2008

(65) Prior Publication Data
US 2009/0103781 A1 Apr. 23, 2009

(30) Foreign Application Priority Data
Oct. 17, 2007 (FR) .................... 07 07309

(51) Int. Cl.
*G06K 9/00* (2006.01)

(52) U.S. Cl. ......... 382/104; 382/155; 382/103; 382/206

(58) Field of Classification Search .......... 382/103–104, 382/106, 107, 108; 701/23, 28, 208, 36, 701/49, 211, 1; 356/3; 362/494
See application file for complete search history.

(56) References Cited

U.S. PATENT DOCUMENTS

| | | | |
|---|---|---|---|
| 5,837,994 A * | 11/1998 | Stam et al. | 250/208.1 |
| 6,484,086 B2 | 11/2002 | Jeon | |
| 6,520,668 B1 * | 2/2003 | Reiss | 362/516 |
| 6,963,657 B1 * | 11/2005 | Nishigaki et al. | 382/106 |
| 7,972,045 B2 * | 7/2011 | Schofield | 362/466 |
| 7,987,034 B2 * | 7/2011 | Taffin | 701/51 |
| 2002/0087253 A1 * | 7/2002 | Jeon | 701/93 |

OTHER PUBLICATIONS

Bertozzi, M. et al., "An Extension to the Inverse Perspective Mapping to Handle Non-Flat Roads"; Proceedings of the IEEE International Conference on the Intelligent Vehicles, XX, XX, Oct. 28, 1998; pp. 305-310.

* cited by examiner

*Primary Examiner* — Vikkram Bali
*Assistant Examiner* — Nancy Bitar
(74) *Attorney, Agent, or Firm* — Jacox, Meckstroth & Jenkins

(57) ABSTRACT

The present invention relates to a process for the automatic determination of the coefficient of a slope from a motor vehicle fitted with a camera.

19 Claims, 1 Drawing Sheet

PROCESS FOR THE AUTOMATIC CALCULATION OF THE COEFFICIENT OF A SLOPE ABOUT TO BE ASCENDED BY A MOTOR VEHICLE AND AN ASSOCIATED DEVICE

CROSS-REFERENCE TO RELATED APPLICATIONS

This application claims priority to French Application No. 0707309 filed Oct. 17, 2007, which application is incorporated herein by reference and made a part hereof.

BACKGROUND OF THE INVENTION

1. Field of the Invention

This invention relates to an advanced driving system and more particularly to a system and process for the automatic calculation of the coefficient of a slope about to be ascended by a motor vehicle and an associated device.

Generally speaking, the domain of the invention is that of advanced driving assistance systems. This domain includes for example the known devices for detecting obstacles, night vision devices, devices for warning the driver that he is approaching a bend, devices for optimizing the use of headlamps in accordance with driving conditions etc. Such devices all make use of different types of sensors. The solutions proposed are essentially based on technologies such as radar, lidar and ultrasound and they are able in particular to detect close obstacles at low speed; these solutions are also based on processes involving the use of devices such as cameras.

2. Description of the Related Art

Sensors of the radar and lidar type, which are typically used for the application of remote detection, such as the ACC system (Autonomous Cruise Control) for example, provide direct information on the position and sometimes the 2D speed of objects located directly in a road scene. This information allows the different objects that are present to be classified and enables to assign to them useful information such as their position and sometimes their speed with current coordinates in two dimensions, relative to the vehicle fitted with the sensor in question and relative to a fixed point of reference if the position of the vehicle is clearly established in this reference.

However, such sensors do not provide a wide range of vision and their angular position is never very precise. Moreover, these sensors do not provide any information on the environment of the roadway, such as the position of the vehicle within its traffic lane, the number of traffic lanes, the trajectory of the road, the classification of obstacles or the recognition of infrastructural elements such as road signs and the like.

Consequently, numerous driving assistance devices use cameras, usually working together with image processing algorithms dedicated to these specific functions. The object of the present invention belongs to such driving assistance devices.

The problem that the present invention aims to solve is as follows: at present there is no means by which the functional characteristics of the motor vehicle can be determined by the arrival of a vehicle at the start of a slope. However, numerous characteristics could be improved.

For example, as shown in FIG. 1, with regard to the lighting of the roadway, the appearance of a slope affects the range of the beam of the headlamps generated by the vehicle. This effect can be disturbing for the driver. On this figure, it can be seen that when a vehicle approaches a slope 100, the range of this beam reduces as the vehicle approaches the slope. For example, in the example given, a headlamp beam capable of covering 80 meters when the vehicle is traveling on a flat road, will only cover 40 meters as shown by a first straight line 101, representing the upper limit of the beam produced by the vehicle. In terms of the slope 100, to restore the range of 80 meters, as shown by a second straight line 102, it is necessary to modify the direction of the headlamps creating the beam in question.

Another example of characteristics that could be improved lies in the flow of fuel to the engine. For example, to maintain a constant speed when a slope is being ascended, the engine will inevitably consume more fuel that when it is traveling on a flat road. If the ascent of the slope is not anticipated by adjusting the flow of fuel to the engine, the speed of the vehicle will fall as the slope commences, which detracts from driving comfort.

Consequently, the fact that a slope is not anticipated is likely to lead to a reduction in driving comfort.

SUMMARY OF THE INVENTION

The object of the present invention is a process for the automatic calculation of the coefficient of a slope about to be ascended by a motor vehicle. Another object of the invention is a device capable of implementing this process.

In accordance with the process according to the present invention, it is possible to anticipate the arrival of a vehicle at a slope, regardless of whether it is an uphill or a downhill slope, by calculating the coefficient of this slope, so as to optimize certain features of the motor vehicle and to facilitate approaching the slope. Such features, for example, belong to the vehicle engine speed characteristics or to the orientation characteristics of the vehicle's headlamps.

The aim of the present invention is to propose a solution to the problems described above. In this way, the present invention has, as its object, the means for anticipating the presence of a slope that is about to be ascended by a motor vehicle.

To this end, the present invention proposes a process that can calculate the angle of the slope of the road taken by the vehicle. Thus, when he reaches a slope, the driver will know precisely, thanks to the device according to the present invention, the angle of the slope, also described as the coefficient of the slope. Knowing such information means that different characteristics of the vehicle can be adapted, for example, the orientation of the headlamps or the amount of fuel consumed by the engine, thereby increasing the level of driving comfort.

The present invention therefore essentially relates to a process for the automatic calculation of the coefficient of a slope that is about to be ascended by a motor vehicle fitted with a camera capable of capturing at least one image of the road scene extending in front of the vehicle, the process comprising the different steps comprising:

detecting, on an image captured by the camera, a first reference mark, belonging to a reference mark type considered having a generally elongated shape and being repeated along the road, the first reference mark being present at a first position and comprising at least one first element and a second element situated on both sides of the road and in the vicinity of the vehicle;

detecting, at a distance from the vehicle, of a second reference mark of the reference mark type considered, with this second reference mark being present at a second position on both sides of the road;

determining, through the use of an image processing system, a change in direction between the direction of the first reference mark and the direction of the second reference mark;

where applicable, i.e., if the existence of a change in direction has been established, deducing from the change of direction the presence of a slope and calculating the coefficient of the slope, by using the characteristics of the observed change of direction.

In addition to the main characteristics mentioned in the preceding paragraph, the process according to the invention may comprise one or more additional steps among the following:

the type of reference mark considered is constituted by road markings.

the type of reference mark considered is constituted by roadsides.

the step consisting in calculating the coefficient of the slope includes an operation consisting in considering flat the road at the location of the first reference mark.

the step consisting in calculating the coefficient of the slope includes an operation consisting in considering constant the width of the road between the first position and the second position;

the second position is situated at a maximum distance detectable by the camera;

the step consisting in calculating the coefficient of the slope includes different operations consisting in:

determining the distance from the first reference mark on the basis of its vertical position in the image by considering flat the road at the location of the first reference mark;

determining, on the captured image, a number of pixels present between the first element and the second element of the first reference mark;

deducing the width of the road from the number of pixels determined and from the distance from the first reference mark;

determining in pixels, the width of the road at the location of the second position;

considering the width of the road as being constant between the first position and the second position;

deducing, from the width of the road determined in pixels, an actual distance between the second position and the vehicle;

counting, in pixels, the height in the captured image, or possibly in another image captured by the camera, at which is situated the second position;

deducing from the above operation a theoretical distance between the second position and the vehicle, corresponding to the presumption of a flat road between the second position and the vehicle deducing, from the difference between the actual distance and the theoretical distance, the coefficient of the slope between a particular point of the road, corresponding to the projection onto the road of the position of the camera installed in the vehicle, and the second position.

Insofar as they are not mutually exclusive, the different additional features of the process according to the invention are combined in all possible associations in order to achieve different embodiments of the process described in the present invention.

The present invention also relates to a device intended to provide driving assistance, mounted in a vehicle, which is able to implement the process according to at least one of the above additional characteristics, the device comprising:

a camera capable of capturing at least one image of the road scene extending in front of the vehicle;

means for image processing in order to detect:

a first reference mark, present at the location of a first position and being constituted from at least a first element and a second element situated on both sides of the road and in the vicinity of the vehicle;

a second reference mark present at the location of a second position at a distance from the vehicle, of the same type as the first reference mark;

means for calculating, using the characteristics of a confirmed change of direction, where applicable, between the first reference mark and the second reference mark, the coefficient of the slope between the second position and a particular point on the road, this particular point corresponding to the projection onto the ground of the camera installed in the vehicle;

means of controlling the direction of a headlamp beam, the control means interpreting information received concerning the coefficient of the slope so as to adjust the direction of the beam;

the device according to the present invention further comprising:

either means for controlling the direction of the headlamp beam, with such control means interpreting information on the coefficient of the slope so as to adjust the direction of the beam;

or means for controlling the supply of fuel into the engine, with such control means interpreting information on the coefficient of the slope so as to adjust the flow of fuel to the engine.

The present invention also relates to a motor vehicle fitted with one of the driving assistance devices according to the invention.

These and other objects and advantages of the invention will be apparent from the following description, the accompanying drawings and the appended claims.

BRIEF DESCRIPTION OF THE ACCOMPANYING DRAWINGS

The invention and its different applications will be better understood by reading the following description and studying the accompanying figures.

These figures are given for indication purposes only and are not intended to limit the scope of the present invention in any way. The figures show as follows.

Figure 3:
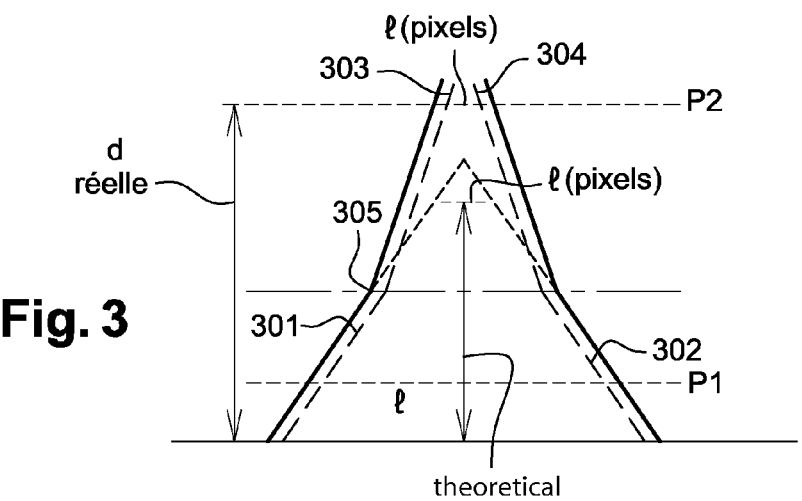
Figure 4:
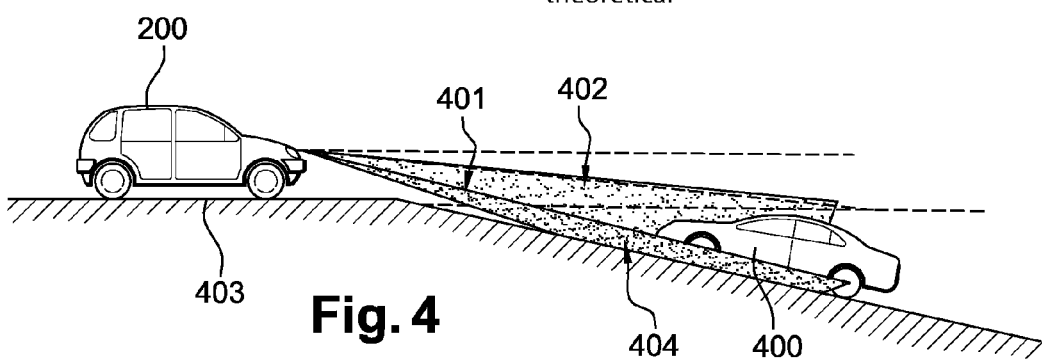

FIG. 3. is a schematic representation of a slope on a road about to be ascended by a vehicle, with the different characteristics arising with a typical application of the process according to the present invention; and FIG. 4 is a schematic representation of a vehicle about to commencing a downward slope employing the process according to the present invention.

DETAILED DESCRIPTION OF THE PREFERRED EMBODIMENTS

The figures show in a non-limitative manner an embodiment of the process according to the present invention in which the process for determining the coefficient of a slope is employed to adjust the direction of a beam of light produced by a headlamp system in the vehicle. However, other applications of the process according to the present invention can be envisaged. Unless otherwise indicated, all characteristics shown on a number of figures retain the same reference number.

Figure 1:
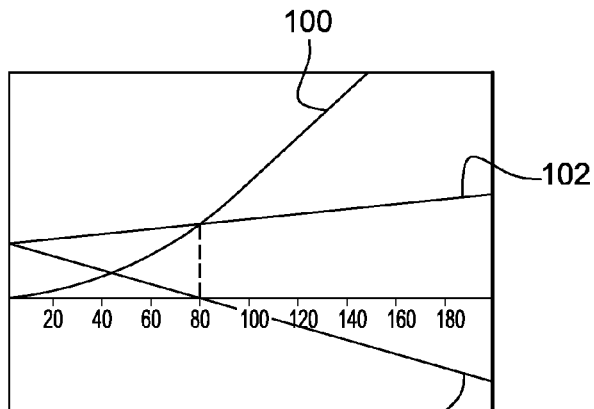
FIG. 1 is a schematic representation of a typical example of the problem that arises when a vehicle arrives at the start of a slope.
Figure 2:
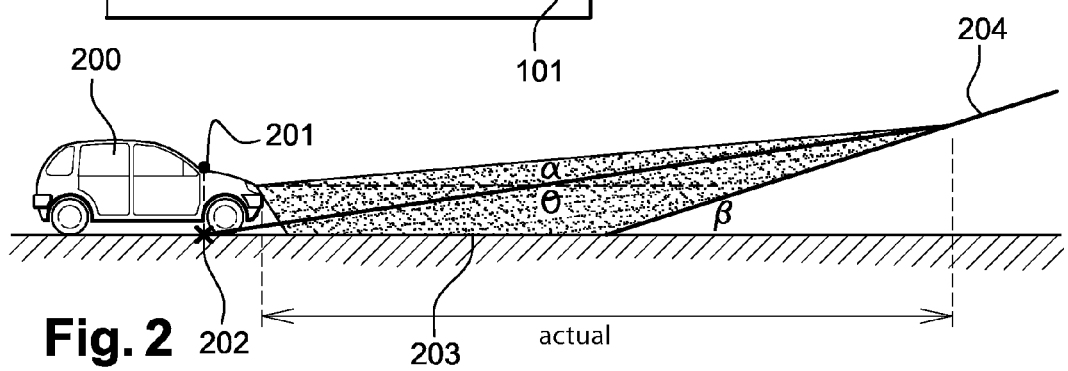
FIG. 2 is a schematic representation of a vehicle about to ascend a slope, with the different parameters arising with a typical application of the process according to the present invention.

An example of the implementation of the process according to the invention, illustrated by means of FIGS. 2 and 3, is as follows:

FIG. 2 shows a vehicle 200 fitted with a camera 201 traveling along a road 203 and about to ascend a slope 204. FIG. 3 shows schematically the road 203, in another view corresponding to the road scene filmed by the camera 201, revealing different parameters arising in a typical embodiment of the process according to the present invention An example of the implementation of the process according to the invention, illustrated by means of FIGS. 2 and 3, is as follows:

In an initial step, reference marks or points 202 present on the road 203 are detected on an image captured by the camera 201 by any algorithm capable of recognizing shapes through image processing. In this way, at the location of a first position P1, a first reference mark can be detected, which comprises a first element 301 and a second element 302, the first element 301 and the second element 302 being arranged on either side of the road 203 and being in an elongated form along a direction generally parallel to the direction of travel of the vehicle 200. Advantageously, the first reference mark 301 is arranged in the vicinity of the vehicle 200, for example, at a distance of about ten meters. Using the same means, at the location of a second position P2, detected on the road 203, a second reference mark is detected, also formed from a first element 303 and a second element 304, of the same type as the elements of the first reference mark. Advantageously, the second reference mark is arranged at the location of a distance corresponding to the maximum distance detectable by the camera 201, typically 50 meters. The range of the detection guarantees high precision for the calculation of the slope, at least up to a distance equivalent to this maximum detectable distance.

Advantageously, the elements constituting the reference marks 202 are in the form of road markings. Their repeated presence along the road 203, and also their elongated form, allows the presence of a slope to be detected. In fact, in such a case, the direction of the road markings on the captured image exhibits a modification between the markings arranged along the flat section of the road 203 and the markings arranged along the slope 204.

Advantageously, a realistic assumption is made that, at a short distance and thereby at the location of the first position P1, the road 203 is flat. In this way, it is possible to determine the distance of this first reference mark from its vertical position in the image and to proceed, in a second step, with counting the number of pixels that are present between the first and second elements 301 and 302, so that this number of pixels can be converted into a metric unit so that the width w of the road 203 can be calculated.

In a following step, the width of the road 203 expressed in pixels, wpixels, can be calculated at the location of the second position P2. By considering that the width of the road 203 is constant between the first position P1 and the second position P2, an actual distance $d_{actual}$ can be calculated on the basis of the number of pixels counted at the location of the second position P2.

In a subsequent step, the height of the second position P2 in the captured image can be calculated in numbers of pixels. From this can then be deduced a theoretical distance $d_{theoretical}$, which would have been observed between the vehicle 200 and the second position P2 if the road 203 had been flat between the first position P1 and the second position P2.

A difference between the theoretical and actual distance confirms the existence of a change of direction 305 between the orientation of the first reference mark and the orientation of the second reference mark and thus the existence of a slope. Here, the theoretical and the actual distances constitute the characteristics of the change of direction between the first reference mark and the second reference mark which enable the coefficient of the slope 204 to be calculated. By using basic trigonometric formulae, the difference between the theoretical and the actual distance enables the mean slope θ between a point on the ground or reference mark 202, which corresponds to the projection of the position of the camera 201 onto the ground, and the second position P2 to be calculated. By extension, the angle θ is considered equivalent to an angle β, which effectively corresponds to the coefficient of the slope 204.

The different operations occurring during the process described above can be achieved on the basis of a single image captured by the camera 201 or by images captured over a period of time, possibly successively.

For a first implementation of the process described above, enabling a constant distance to be maintained on an illuminated road by a headlamp device, an angle α, controlling the headlamps and guaranteeing a constant range of visibility, can be calculated on the basis of the mean slope θ. If it is assumed that the second position P2 is situated at a distance less than the range desired for the light beam, it can also be assumed that the mean slope remains constant beyond the second position P2 in order to determine the value of the angle α to be applied in order to illuminate the entire range required.

As FIG. 4 shows, the process according to the invention can also be used where the slope detected is a downhill slope 404 following on from the road 403. In this case, the initial headlamp beam 402 can be lowered producing a modified beam 401, which is no more likely to dazzle the driver of an oncoming vehicle 400 ascending the slope 404.

In a further application of the process described above, the presence of a slope is anticipated and a strategy is developed whereby the flow of fuel to the engine is controlled so as to optimize its performance when the vehicle 200 starts to ascend the slope. For example, the quantity of fuel supplied to the engine can be correlated to the calculated mean slope θ.

While the process herein described, and the form of apparatus for carrying this process into effect, constitute preferred embodiments of this invention, it is to be understood that the invention is not limited to this precise process and form of apparatus, and that changes may be made in either without departing from the scope of the invention, which is defined in the appended claims.

What is claimed is:

1. A process for the automatic calculation of the coefficient of a slope about to be ascended by a motor vehicle fitted with a camera capable of capturing at least one image of a road scene extending in front of said motor vehicle, the process comprising the different steps comprising:
   detecting, on an image captured by the camera, a first reference mark, belonging to a reference mark type considered having a generally elongated shape and being repeated along the road, said first reference mark being present at a first position and comprising at least one first element and a second element situated on both sides of the road and in the vicinity of the motor vehicle;
   detecting, at a distance from the motor vehicle, of a second reference mark of the reference mark type considered, said second reference mark being present at a second position on both sides of the road;

determining, through the use of an image processing system, a change of direction between the direction of the first reference mark and the direction of the second reference mark;

where applicable, deducing from said change of direction the presence of a slope and calculating the coefficient of said slope, by using the characteristics of said change of direction.

2. The process in accordance with claim 1, wherein the type of reference mark considered is constituted by road markings.

3. The process in accordance with claim 1, wherein the type of reference mark considered is constituted by roadsides.

4. The process in accordance with claim 1, wherein the step consisting in calculating the coefficient of the slope includes an operation consisting in considering flat the road at the location of the first reference mark.

5. The process in accordance with claim 1, wherein the step consisting in calculating the coefficient of the slope includes an operation consisting in considering constant the width of the road between the first position and the second position.

6. The process in accordance with claim 1, wherein the second position is situated at the location of the maximum distance detectable by the camera.

7. A process in accordance with claim 1, wherein the step consisting in calculating the coefficient of the slope comprising the steps of:

determining the distance of the first reference mark on the basis of its vertical position in the image by considering flat the road at the location of the first reference mark;

determining, on the captured image, a number of pixels present between the at least one first element and a second element of the first reference mark;

deducing the width of the road from the number of pixels determined and from the distance from the first reference mark;

determining in pixels, the width of the road at the location of the second position;

considering the width of the road as being constant between the first position and the second position;

deducing an actual distance from the width of the road determined in pixels;

counting, in pixels, the height in the captured image at which is situated the second position;

deducing from the above operation a theoretical distance corresponding to the presumption of a flat road between the second position and the motor vehicle;

deducing, from the difference between the actual distance and the theoretical distance, the coefficient of the slope between a particular point of the road, corresponding to the projection onto the road of the position of the camera installed in the motor vehicle, and the second position.

8. A driving assistance device, installed in a vehicle, suited to implement the process according to claim 1, comprising:

a camera capturing at least one image of the scene of the road extending in front of said vehicle;

means for image processing in order to detect:

a first reference mark, present at the location of a first position and being constituted from at least a first element and a second element situated on both sides of the road and in the vicinity of the vehicle;

a second reference mark present at the location of a second position at a distance from the vehicle, of the same type as the first reference mark;

means for calculating, using the characteristics of a detected change of direction, where applicable, between the first reference mark and the second reference mark, the coefficient of the slope between the second position and a particular point on the road, this particular point corresponding to the projection onto the ground of the position of the camera installed in the vehicle; and means for controlling the direction of a headlamp beam, said control means interpreting information received concerning the coefficient of the slope so as to adjust the direction of the headlamp beam.

9. The driving assistance device, installed in a vehicle, suited to implement the process according to claim 1, comprising:

a camera capturing at least one image of a scene of the road extending in front of said vehicle;

means for image processing in order to detect:

a first reference mark, present at the location of a first position and being constituted by at least a first element and a second element situated on both sides of the road and in the vicinity of the vehicle;

a second reference mark present at the location of the second position at a distance from the vehicle, of the same type as the first reference mark;

means for calculating, using the characteristics of a detected change of direction, where applicable, between the first reference mark and the second reference mark, the coefficient $\theta$ of the slope between the second position and a particular point on the road, with this particular point corresponding to the projection onto the ground of the position of the camera installed in the vehicle;

means for controlling the flow of fuel into the engine, said control means interpreting information relating to the coefficient of the slope so that the flow of fuel to be engine can be controlled.

10. A motor vehicle equipped with a device in accordance with claim 8.

11. The process in accordance with claim 2, wherein the step consisting in calculating the coefficient of the slope includes an operation consisting in considering flat the road at the location of the first reference mark.

12. The process in accordance with claim 3, wherein the step consisting in calculating the coefficient of the slope includes an operation consisting in considering flat the road at the location of the first reference mark.

13. The process in accordance with claim 2, wherein the step consisting in calculating the coefficient of the slope includes an operation consisting in considering constant the width of the road between the first position and the second position.

14. The process in accordance with claim 3, wherein the step consisting in calculating the coefficient of the slope includes an operation consisting in considering constant the width of the road between the first position and the second position.

15. The process in accordance with claim 2, wherein the second position is situated at the location of the maximum distance detectable by the camera.

16. The process in accordance with claim 3, wherein the second position is situated at the location of the maximum distance detectable by the camera.

17. A driving assistance device installed on a vehicle comprising:

a camera mounted on the vehicle;

a device mounted on the vehicle and coupled to the camera;

said device receiving an image captured by the camera and calculating a first reference mark in the image at a first position and a second reference mark in the image at a second position and calculating a coefficient of a slope between said second position and a particular point on the road on which the vehicle is travelling;

a headlight control for adjusting a direction of a headlamp beam in response to the calculated coefficient;

said device for image processing in order to detect:

a first reference mark, present at the location of a first position and being constituted from at least a first element and a second element situated on both sides of the road and in the vicinity of the vehicle; and a second reference mark present at the location of a second position at a distance from the vehicle, of the same type as the first reference mark;

said device calculating, using the characteristics of a detected change of direction, where applicable, between the first reference mark and the second reference mark, the coefficient of the slope between the second position and a particular point on the road, this particular point corresponding to the projection onto the ground of the position of the camera installed in the vehicle.

18. The driving assistance device as recited in claim 17 wherein said particular point corresponds to a projection onto or relative to the ground of the position of the camera installed in the vehicle.

19. The driving assistance device as recited in claim 17 wherein said driving assistance device further comprises a fuel control for controlling a flow of fuel into an engine in the vehicle using said coefficient of said slope.

* * * * *